May 28, 1957     E. C. PALMENBERG ET AL     2,794,129
COMBINED AIR TURBINE CONTROL VALVE MECHANISM AND GENERATOR
Filed Jan. 28, 1955
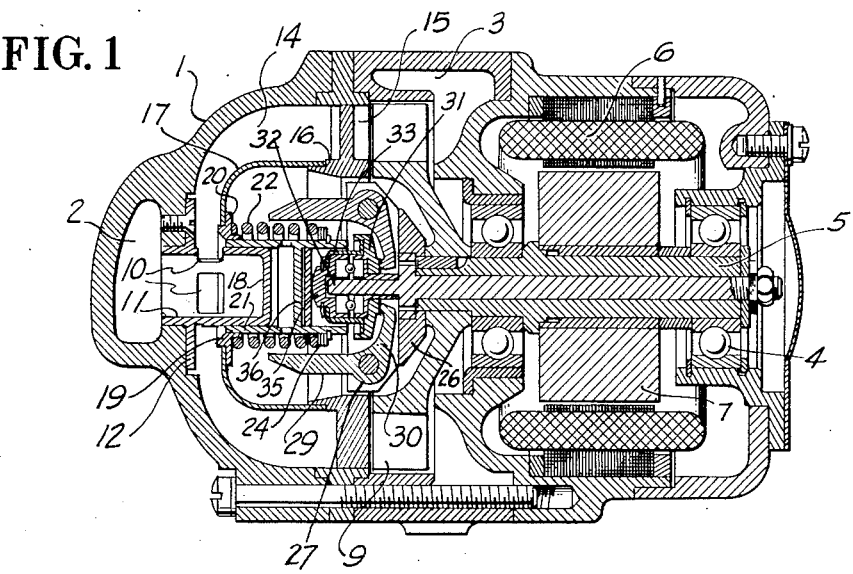
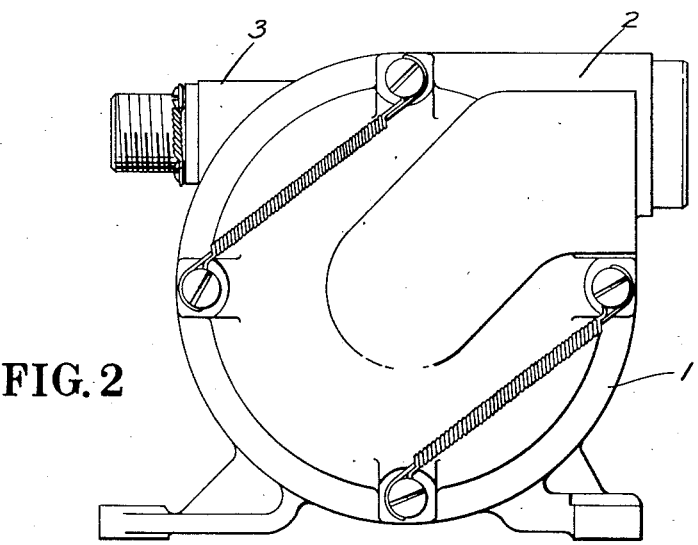
*INVENTORS*
EDWARD C. PALMENBERG
CASIMER F. REMUS
BY
*ATTORNEY*

United States Patent Office 2,794,129
Patented May 28, 1957

2,794,129

COMBINED AIR TURBINE CONTROL VALVE MECHANISM AND GENERATOR

Edward C. Palmenberg, Nanuet, N. Y., and Casimer F. Remus, Clifton, N. J., assignors to Bendix Aviation Corporation, Teterboro, N. J., a corporation of Delaware Application January 28, 1955, Serial No. 484,606

6 Claims. (Cl. 290—52)

This invention is concerned with new and useful improvements in generators, and it has for its general object the provision of an improved and compact air turbine driven electric power supply unit, wherein there is incorporated mechanism controlling the supply of pressure air so as to hold the rotative speed of the turbine at a predetermined rate.

While this device is subject to a variety of uses and applications, it finds particular use as an auxiliary power supply for electrically operated aircraft flight instruments.

The invention further lies in the novel structure, arrangement, and general organization of its various members, as well as in their cooperative association with one another.

The foregoing and other objects and advantages of this invention will appear more fully hereinafter from a consideration of the detailed description which follows, taken in conjunction with the accompanying drawings wherein an embodiment of the invention is illustrated by way of example. It is to be expressly understood, however, that the drawings are for purposes of illustration and description only, and are not intended as a definition of the limits of the invention.

In the drawings:

Fig. 1 is a longitudinal cross section through an air-turbine driven power supply unit embodying the invention; and Fig. 2 is a left end view of the device.

Referring to the drawings, there is disclosed a housing 1 having a scroll pressure air supply inlet 2 and an exhaust outlet 3. Axially supported in housing bearings 4 is a drive shaft 5. This shaft drives a generator, the field coils 6 of which are supported by the housing, and the armature 7 of which is a permanent magnet carried on the drive shaft for rotation within the field coils.

The drive shaft is driven by a turbine 9 mounted thereon. The latter is powered by pressure air entering from the inlet scroll and passing through ports 10 formed in the periphery of a cylindrical valve member 11. The latter is supported by a flange 12 to the housing and opens out at one end to communicate with the inlet scroll 2. Valve member ports 10 communicate with a passage 14 that communicates through the nozzles 15 of a nozzle head 16 to the blades of the turbine. The used air exhausts through the outlet 3. Projecting axially from the nozzle head in the direction of the inlet is a crown or dome structure 17. A closed-over end 18 of valve member 11 extends through a hub fitting 19 of the dome structure. This extension of the valve member is received in and supports an end of a slidable valve sleeve 21. The latter is designed to slide over the extension 18 to progressively close the ports 10. A coil spring 22 about the sleeve, limited between the inner wall 20 of the hub fitting 19 and a stop collar 24 mounted on the sleeve, serves to constantly tension valve sleeve 21 into the dome structure 17. In this position of the valve sleeve, ports 10 are uncovered and communication is normally established thereby from the inlet, through passage 14 to the nozzle head.

The sleeve member 21 is adapted to be driven progressively against the tension of spring 22 over ports 10 to reduce the air flow to the turbine by suitable governor actuated means. The latter comprises a yoke 26 fixed to the drive shaft, in which yoke are pivoted on pins L formed governor fly-weights 27. At the speed of the drive shaft increases beyond a rated maximum, arms 29 of the fly-weights swing out, causing the other arms 30 thereof to move a thrust washer 31 to the left along a reduced end portion 32 of the drive shaft. This reduced end portion of the drive shaft carries a slide bearing 33 which is housed in a casing. This casing is received in the right open end of the valve sleeve 21. A boss 35 at the end of the casing normally abuts against a rib wall 36 of the sleeve.

In the operation of the device, pressure air admitted through scroll 2 passes through the peripheral ports 10 of valve member 11. From the latter, the air flows in the passage 14 around the dome structure 17 and, through the nozzles of the nozzle head to attack and drive the turbine, the used air exhausting through outlet 3.

The rotating turbine drive shaft 5, which in turn rotates the armature member 7 thereof in the field coils to generate a supply of electrical power. As the turbine speed and that of the associated shaft increases beyond a rated maximum the governor fly weights are pivoted to thrust the washer member 31 leftward. This thrust is transmitted through the slide bearing 33 against the rib 36 in the valve sleeve, causing the latter sleeve to move leftward to progressively cover over the sleeve ports 10. The reduction caused in the air supply to the turbine slows the turbine down, whereupon the valve sleeve member progressively restores under its spring 22. In this manner, the speed of the turbine is held to a predesigned maximum rate.

While an embodiment of the invention has been illustrated and described in detail, it is to be expressly understood that the invention is not limited thereto. Various changes can be made in the design and arrangement of the parts without departing from the spirit and scope of the invention as the same will now be understood by those skilled in the art, and it is my intent, therefore, to claim the invention not only as shown and described, but also in all such forms and modifications as may be reasonably construed to be within the spirit of the invention and the scope of the appended claims.

What is claimed is:

1. An air driven turbine electrical power supply unit comprising, a common shaft, a generator armature mounted on the shaft, an air driven turbine mounted on the shaft interiorly of said armature, passage means having ports coaxial with said shaft for conducting a supply of pressure air to drive the turbine, speed governor means carried by the shaft interiorly of said turbine and responsive to certain speeds of the shaft, and valve means operatively associated with the governor through the end of said common shaft for closing over said ports of the pressure air supply passage.

2. In an air driven turbine electrical power supply unit, a housing, a shaft rotatably supported by two mountings within the housing and having a short free end inwardly of the interior one of said mountings, a turbine mounted upon said free end, passage means for conducting a supply of pressure air through the housing to drive the turbine, a generator armature carried by said shaft between said two mountings, said passage means including valve inlets within said housing spaced adjacent the projected axis of said short free end and means within the housing responsive to the speed of the drive shaft governing the supply of pressure air being conducted to the housing through the said inlets.

3. In an air driven turbine electrical power supply unit, a housing, a generator armature mounted on a drive shaft rotatably supported within the housing, generator field coils surrounding the armature and mounted within the housing, a turbine mounted within the housing upon the drive shaft, passage means within the housing for conducting pressure air from an inlet of the housing to the blades of the turbine, a governor responsive to the speed of the drive shaft and including centrifugally operable fly-weight means, a valve slidable across the passage means by action of the fly-weight means at a location intermediate said inlet and the part of said passage means adjacent said blades of the turbine to progressively close off communication of the passage means with the turbine blades, and spring means constantly urging the valve in a direction out of the passage means.

4. The combination, in a compact air driven turbine operated electrical supply unit of a housing having air passage means for supplying air to a turbine, a common drive shaft carrying the armature of a generator, a turbine to drive the shaft mounted on said shaft adjacent said generator but inwardly thereof, a governor responsive to the speed of the shaft mounted on the other end of said shaft, said air passage means including ports coaxial with said shaft, and valve means actuable by the governor to regulate supply of pressure air through said ports within the housing to the turbine.

5. A fluid-driven-turbine power supply unit comprising a common shaft, an energy-changing sub-unit which requires operation at or less than a predetermined speed mounted on one end of said shaft, a fluid-driven turbine mounted on said shaft adjacent said sub-unit, passage means in said unit for conducting a supply of fluid to drive said turbine, said passage means including a fluid inlet device having large ports which are coaxial with said shaft, speed-responsive governor means mounted on the other end of said common shaft and means actuated by said governor means for closing and opening said large ports when a predetermined speed is or is not attained by said turbine whereby the speed of said turbine and hence the output of said sub-unit is regulated.

6. The unit defined by claim 5 and further including the feature that said last-mentioned means comprises a coaxial sleeve which slides over said large coaxial ports.

References Cited in the file of this patent
UNITED STATES PATENTS

| | | |
|---|---|---|
| 1,369,863 | White | Mar. 1, 1921 |
| 1,420,076 | Bouche et al. | June 20, 1922 |
| 1,446,787 | Dake | Feb. 27, 1923 |
| 1,484,813 | Dake | Feb. 26, 1924 |
| 1,528,754 | Bresson | Mar. 16, 1925 |
| 2,642,543 | Teague et al. | June 16, 1953 |